United States Patent
Kamble et al.

(10) Patent No.: US 12,530,348 B2
(45) Date of Patent: Jan. 20, 2026

(54) OPTIMIZED LARGE LANGUAGE MODEL INFERENCE FROM STRUCTURED DATA VIA INTERMEDIATE DOCUMENTS

(71) Applicant: Zoom Video Communications, Inc., San Jose, CA (US)

(72) Inventors: Shweta Kamble, San Jose, CA (US); Jatinder Kaur, San Jose, CA (US); Sharad Mathur, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 4 days.

(21) Appl. No.: 18/680,514

(22) Filed: May 31, 2024

(65) Prior Publication Data
US 2025/0370996 A1    Dec. 4, 2025

(51) Int. Cl.
*G06F 16/242*    (2019.01)
*G06F 16/22*    (2019.01)
*G06F 16/248*    (2019.01)
*G06F 16/93*    (2019.01)
*G06F 40/289*    (2020.01)

(52) U.S. Cl.
CPC ........ *G06F 16/243* (2019.01); *G06F 16/2282* (2019.01); *G06F 16/248* (2019.01); *G06F 16/93* (2019.01); *G06F 40/289* (2020.01)

(58) Field of Classification Search
None
See application file for complete search history.

(56) References Cited

U.S. PATENT DOCUMENTS

| | | | | |
|---|---|---|---|---|
| 12,195,727 B2 * | 1/2025 | Li | ........................... | A01H 3/00 |
| 12,353,987 B1 * | 7/2025 | Saleh | ...................... | G06N 3/04 |
| 2023/0193193 A1 * | 6/2023 | Li | ........................... | C05F 11/08 |
| | | | | 435/253.3 |
| 2024/0000032 A1 * | 1/2024 | Ekanayake | .............. | C12N 1/20 |
| 2024/0008434 A1 * | 1/2024 | Ekanayake | ............ | A01N 63/20 |
| 2024/0127026 A1 * | 4/2024 | Manandise | ........... | G06N 3/006 |
| 2024/0362093 A1 * | 10/2024 | Zhou | .................... | G06F 16/243 |
| 2024/0428005 A1 * | 12/2024 | Abraham | ................ | G06F 16/38 |

(Continued)

OTHER PUBLICATIONS

Inferrring Relationships between Tabular Data and Topics using LLM for a Dataset Search Task (Year: 2024).*

(Continued)

*Primary Examiner* — Kim T Nguyen
(74) *Attorney, Agent, or Firm* — Kilpatrick Townsend & Stockton LLP

(57) ABSTRACT

Techniques for optimized LLM inference from structured data via intermediate documents ("LLMs") are disclosed. In an example method, a computing device accesses a database including a set of collections. The computing device generates one or more documents based on a first collection of the set of collections. The computing device determines one or more portions of the one or more documents based on at least one topic of the one or more documents. The computing device generates an embedded representation of each portion. The computing device receives, from a client device, a first query, including at least a first topic. The computing device determines a first portion of the one or more portions based on the first topic. The computing device generates a response based on the first query and the first portion and outputs the response to the client device.

20 Claims, 8 Drawing Sheets

(56) References Cited

U.S. PATENT DOCUMENTS

| | | | |
|---|---|---|---|
| 2025/0063140 A1* | 2/2025 | Grillo | G10L 15/22 |
| 2025/0217400 A1* | 7/2025 | Mansfield | G06F 16/338 |
| 2025/0225008 A1* | 7/2025 | Dotan-Cohen | G06F 16/9038 |
| 2025/0245218 A1* | 7/2025 | Longoni | G06F 16/24578 |
| 2025/0245248 A1* | 7/2025 | Brenner | G06F 16/338 |
| 2025/0251850 A1* | 8/2025 | George | G06Q 50/184 |
| 2025/0252122 A1* | 8/2025 | Bhura | G06F 16/3347 |

OTHER PUBLICATIONS

Context Aware Query Rewriting for Text Rankers using LLM (Year: 2023).*

Snowflake "Snowflake Cortex For Generative AI" pulled from the internet May 31, 2024: https://www.snowflake.com/en/data-cloud/cortex/, 2024.

* cited by examiner

OPTIMIZED LARGE LANGUAGE MODEL INFERENCE FROM STRUCTURED DATA VIA INTERMEDIATE DOCUMENTS

FIELD

The present application generally relates to data analytics for digital communications, and more particularly relates to techniques for optimized large language model ("LLM") inference from structured data via intermediate documents.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
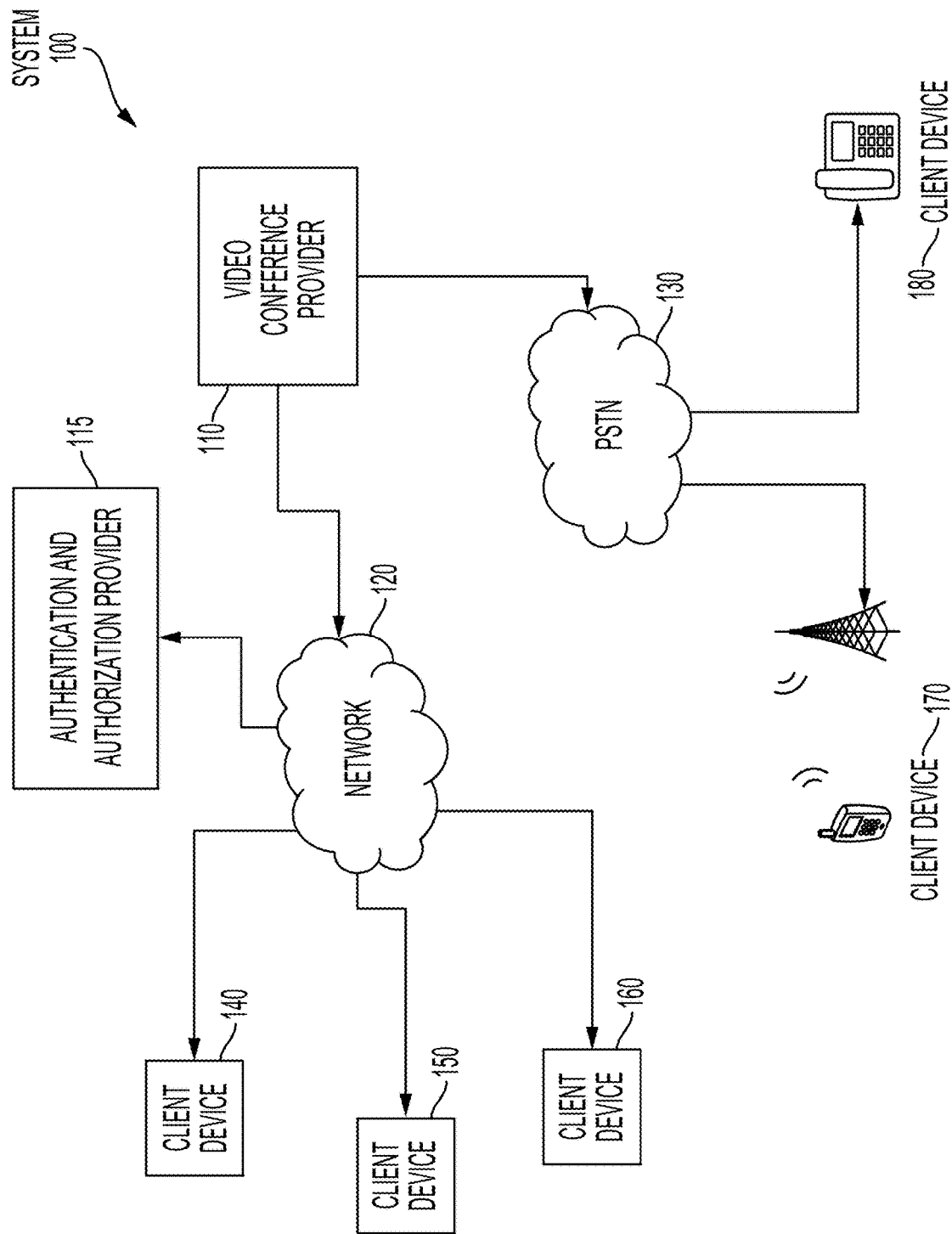
FIG. 1 shows an example system that provides videoconferencing functionality to various client devices, according to some aspects of the present disclosure.

Examples are described herein in the context of techniques for optimized LLM inference from structured data via intermediate documents. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing platforms are by now a hub of digital communication activity including support for applications such as video conferencing, chat, email, whiteboarding, telephony, and so on. Large amounts of data can be generated and persisted during routine operation of such platforms. In some examples, the generated data may be persisted as structured or semi-structured data in a data store such as a data warehouse for later analysis. For example, business analytics tools or data analysis tools may be used to extract insights from the persisted data regarding usage statistics, regulatory compliance, network troubleshooting, accounting trends, and so on.

Although possession of large quantities of data can yield useful insights, extraction of those insights can present a formidable data wrangling problem with a steep learning curve. Existing approaches typically require a data scientist to garner some understanding of the persisted data model and then develop bespoke tools that can be used by various stakeholders. For instance, a data scientist charged with developing analytics tools for a video conferencing platform may design a collection of queries (e.g., Structured Query Language ("SQL") queries) that can be used to retrieve data in response to questions posed by the various stakeholders. The data scientist may then use those results to develop a dashboard, a data exploration tool, or a report-generation tool.

Importantly, authoring queries and development of tools requires considerable technical knowledge and is generally not possible for the stakeholders themselves. As a result, the availability of data scientist resources is a significant and expensive bottleneck for the extraction of analytics insights. For example, data scientists may have to expend time and resources first learning the relevant business context, mapping the data model, or developing tools. Only much later can the data scientists provide answers to stakeholders using, for example, dashboards or spreadsheets. This process demands not only technical expertise in data manipulation and query optimization but also a deep understanding of the business domain to provide relevant and actionable insights.

Thus, existing approaches can result in untapped insights, inefficient extraction of analytics insights, and loss of information in translation between stakeholders and data scientists. Additionally, existing approaches may often lead to inefficiencies and delays due to the need for iterative understanding and tool development. For example, a stakeholder with an insight about persisted data may be dissuaded from posing an insightful question if considerable time lag or delay, cost, labor, or drain on computational resources will be the result.

These difficulties can be addressed using techniques for optimized LLM inference from structured data via intermediate documents. For instance, the techniques disclosed herein can enable stakeholders to query persisted data directly, themselves, by asking natural language questions using a chat-like interface. The following non-limiting example is provided to introduce certain embodiments.

In the example method, a computing system accesses a database with a number of collections, such as relational database tables. The database may be, for instance, a data warehouse based on a relational database with a number of tables that can be queried using SQL. The computing system then generates one or more documents based on one of the tables in the database. The generated documents may be a representation of the table contents in natural language form.

For example, consider a data warehouse including a "Network Statistics" table including a large number of rows and columns such as timestamps, network latencies, Quality of Service (QoS) statistics, usage and capacity, and so on. In some examples, each row may be converted into a natural language sentence such as "At 1:23 PM on May 23, 2023, the network statistics for the New York network include 25 packets in-flight, a network latency of 27 milliseconds, and an average throughput of 29 megabits per second."

The computing system then determines one or more portions of the generated documents based on at least one topic. This is sometimes referred to as a "chunking" process. The chunking process may involve subdividing the generated documents into collections of document portions including topically related content.

For example, a first portion of a document generated based on the Network Statistics table described above may be identified based on its inclusion of the New York location. A second portion of a document generated based on a Customers table may likewise be identified based on its inclusion of customers associated with New York. The first and second portion are grouped together as a "chunk" based on their both including information relating to New York. In this example, the topic is a location, but the topic can be any string, numerical value, or other value that is found in common among one or more tables. In general, the topic may refer to any element that unifies one or more document portions, such as a common place, person, ID number or string, income, etc.

For each portion thus determined, the computing system generates an embedded representation of the portion. For example, a machine learning ("ML") model such as an encoder model can be used to convert the portions into embedded vectors. The embedded vectors may be high-dimensional vector representations of the portions that can be indexed and readily queried using, for example, a vector database.

The computing system then receives, from a client device, a query including at least one topic. For example, the client device may be used by a non-technical stakeholder to ask a natural language question about customers' experience with the network in the New York area. The query, or a portion thereof, can be encoded using a process similar to the encoding of the portions to obtain an embedded representation of the query. The computing device selects a portion from among the indexed portions based on the topic as now encoded in the embedded representation of the query. In one example, the vector database can use a similarity measure between the embedded vector based on the query and the indexed embedded vectors associated with the chunked document portions to select an embedded vector from the vector database.

The computing system then generates a response based on the received query and the selected portion. For example, the received query and the selected portion can be output to an LLM. This approach to combining the query with additional context based on the query is sometimes referred to as retrieval-augmented generation ("RAG"). The LLM can generate a response based on the received query and the selected portion which can then be output to the client device, again using natural language. The addition of the extra context via the RAG mechanism may be fast due to the efficient retrieval of the topic-specific information from the vector database and more accurate (e.g., a reduced degree of inaccuracies or "hallucinations" from the LLM output) due to the added context for responding.

The non-technical stakeholder's natural language question from the example above about customers' experience with the network in the New York area can thus be answered in natural language. A complete example exchange may be begin with the stakeholder asking, "Which customers in the New York area have been having network problems recently?" The computing system can respond, using the techniques above, "Customer A and Customer B, both in the New York area, experienced low network latency and throughput in the past month."

The innovations of the present disclosure provide significant improvements in the technical field of data analytics. The traditional workflow including extraction of tabular information using complex SQL queries and then converting the retrieved information into a useful format for consumption by non-technical users is a complex, time-consuming process that may be a full-time job for some. The techniques disclosed herein can unburden the data scientist from some manual work and allow stakeholders to ask questions of the persisted data, on demand, with any degree of customization or specificity. Previous approaches may have resulted in such improvements only after long waits or may have prevented them altogether in cases where data science resources were not available. The techniques result in improved efficiency through effective use of topically indexed context via the RAG mechanism. Accuracy of the response can likewise be improved due to the additional context added to the LLM context for responding via the RAG mechanism.

Moreover, the underlying computing systems are improved by the methods described herein. The use of a natural language query in conjunction with LLMs using RAG can be a replacement for traditional querying of databases, and thus constitutes an improvement of over data housed in relational tables. Additionally, the techniques of this disclosure can reduce overall consumption of computational resources. Instead of generating responses from scratch, the LLM can use the information retrieved by the RAG system (e.g., the vector database) as a starting point, which can reduce the computational load and improve the efficiency of the response generation process. Looking up embedded representations using, for example, the vector database may be, in some examples, more efficient than querying a relational database.

These illustrative examples are given to introduce the reader to the general subject matter discussed herein and the disclosure is not limited to these examples. The following sections describe various additional non-limiting examples of systems and methods for optimized LLM inference from structured data via intermediate documents.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
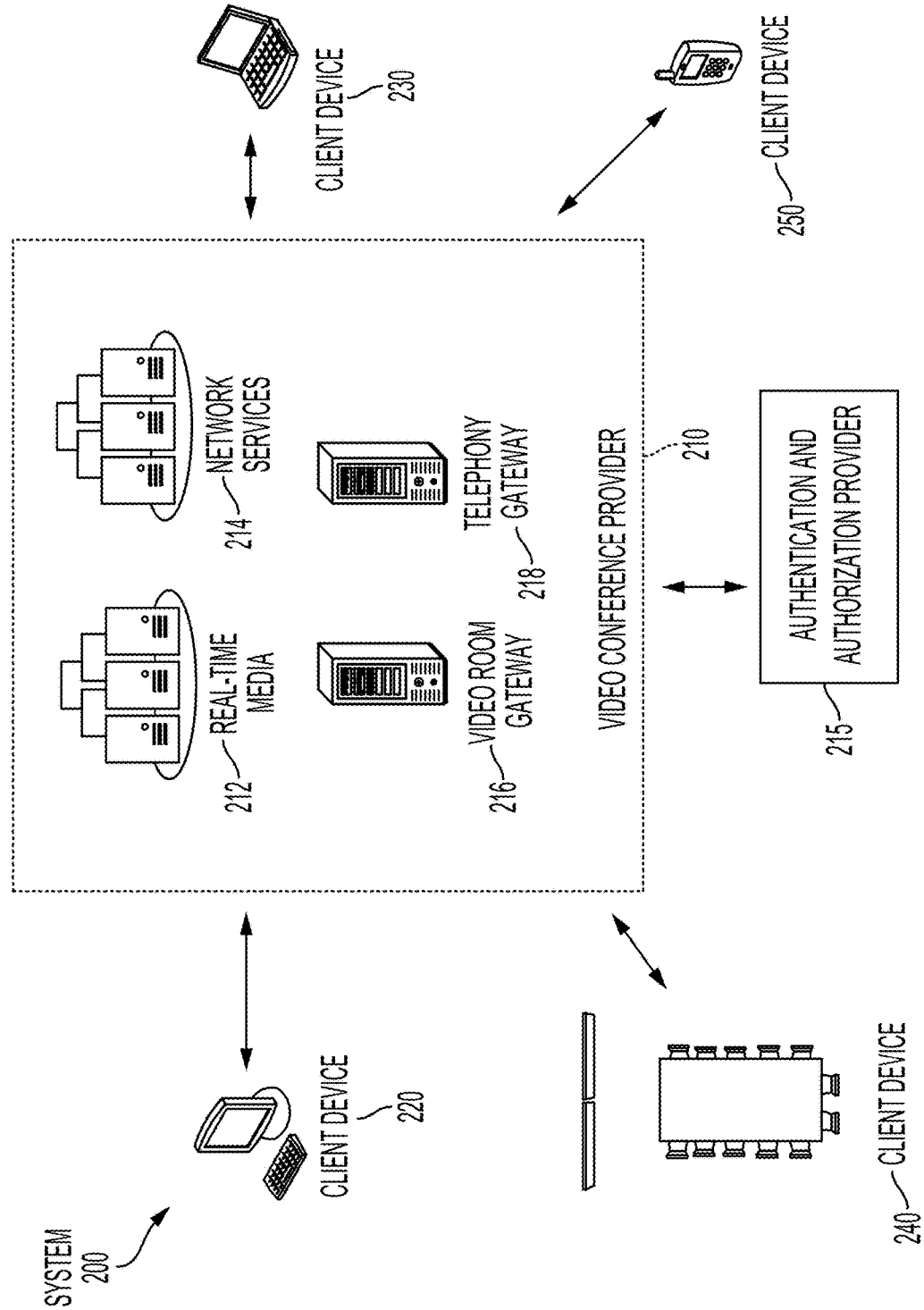
FIG. 2 shows an example system in which a video conference provider provides videoconferencing functionality to various client devices, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
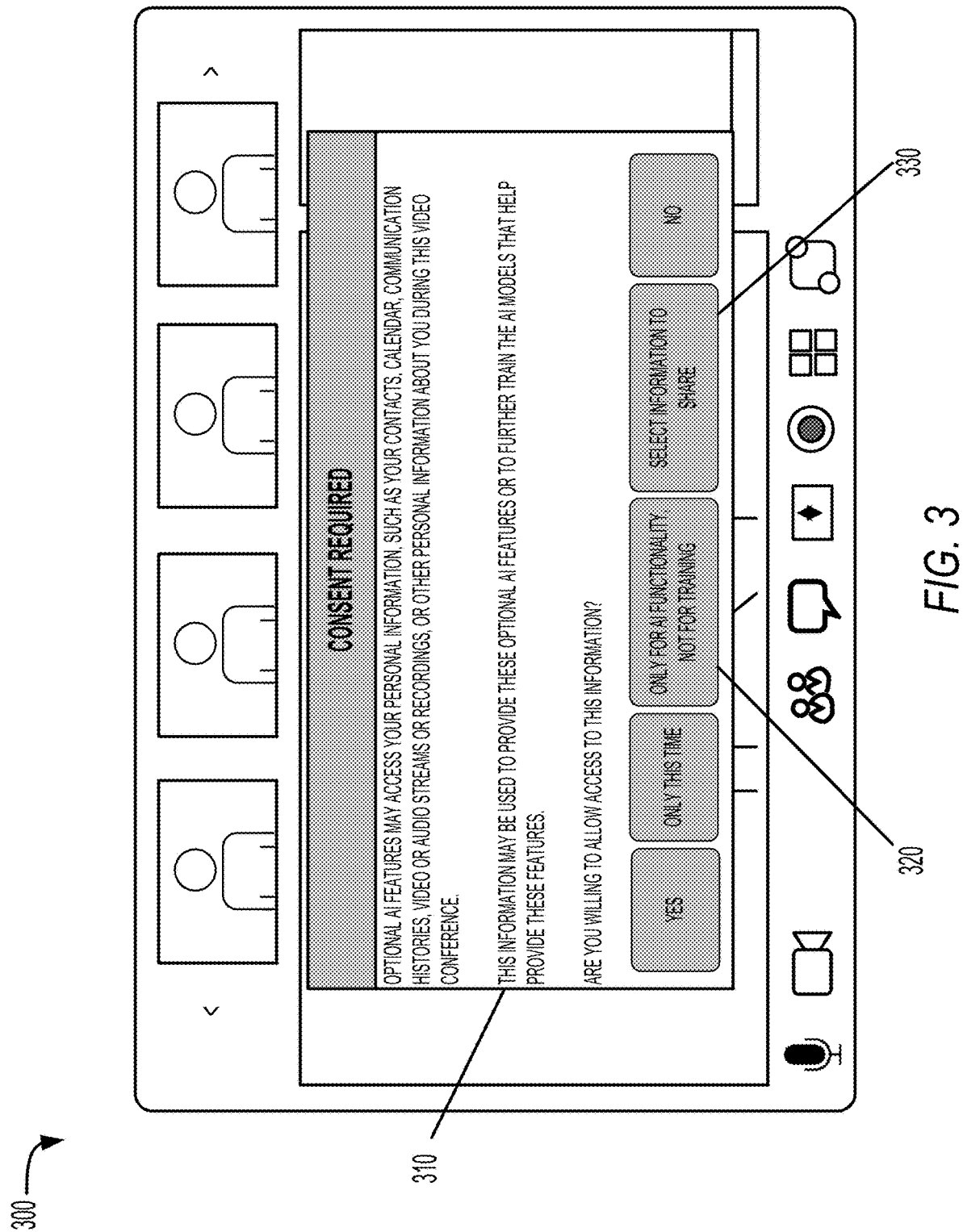
FIG. 3 shows an example user interface that may be used in some example systems configured for techniques for optimized LLM inference from structured data via intermediate documents, according to some aspects of the present disclosure.

Turning next to FIG. 3, FIG. 3 shows an example user interface 300 that may be used in some example systems configured for optimized LLM inference from structured data via intermediate documents. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default—account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the GUI has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
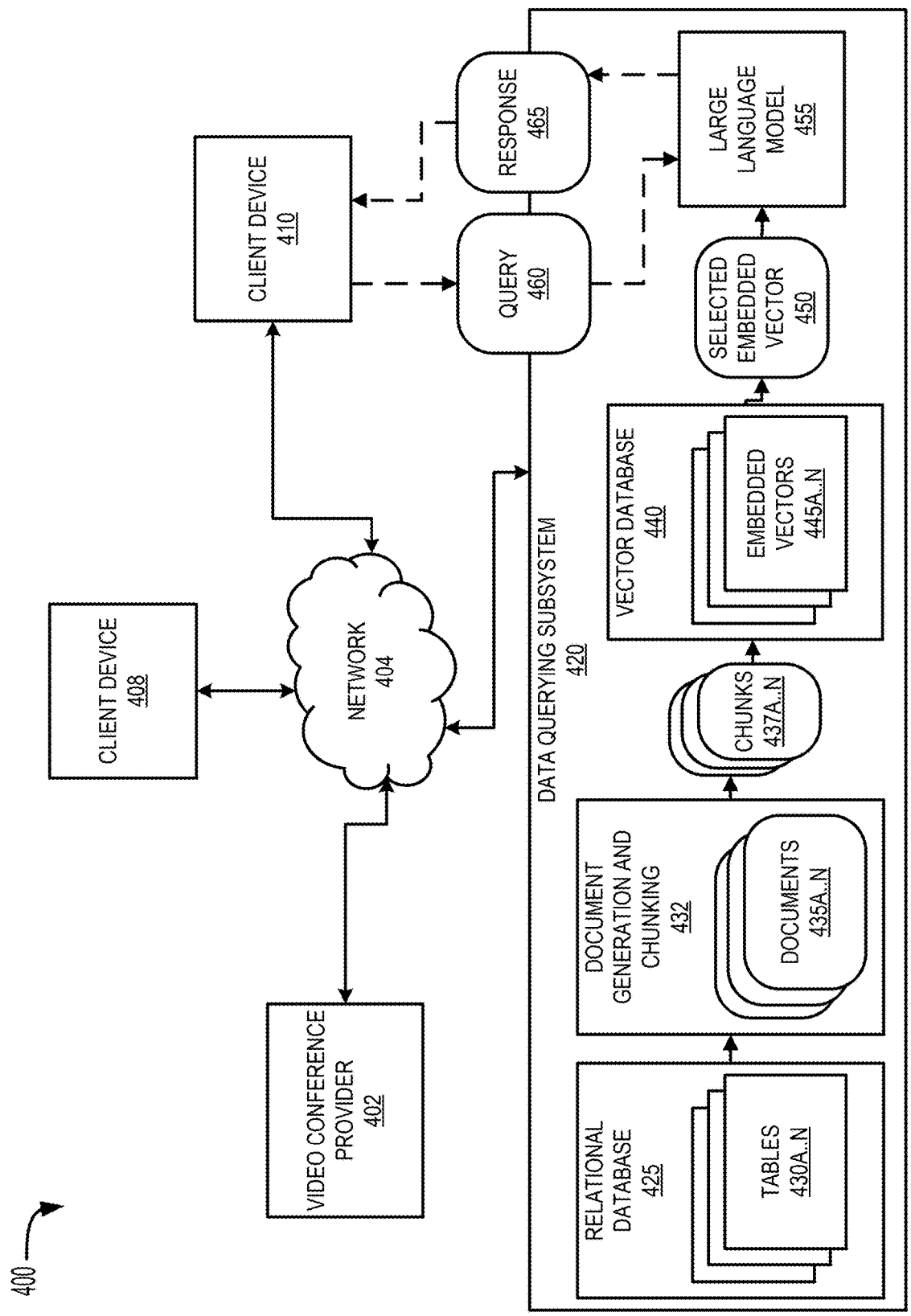
FIG. 4 shows an example of a system for optimized LLM inference from structured data via intermediate documents, according to some aspects of the present disclosure.

Referring now to FIG. 4, FIG. 4 shows an example of a system 400 for optimized LLM inference from structured data via intermediate documents, according to some aspects of the present disclosure. System 400 includes two client devices 408, 410 communicatively coupled with video conference provider 402 over a network 404. Network 404 may include the Internet, public networks, private networks, or combinations thereof. Video conference provider 402 is typically a server or collection of servers, including a combination of privately or cloud-hosted devices. Video conference provider 402 may be similar, in some respects, to the video conference providers 110, 210 described above with respect to FIGS. 1 and 2.

Figure 6:
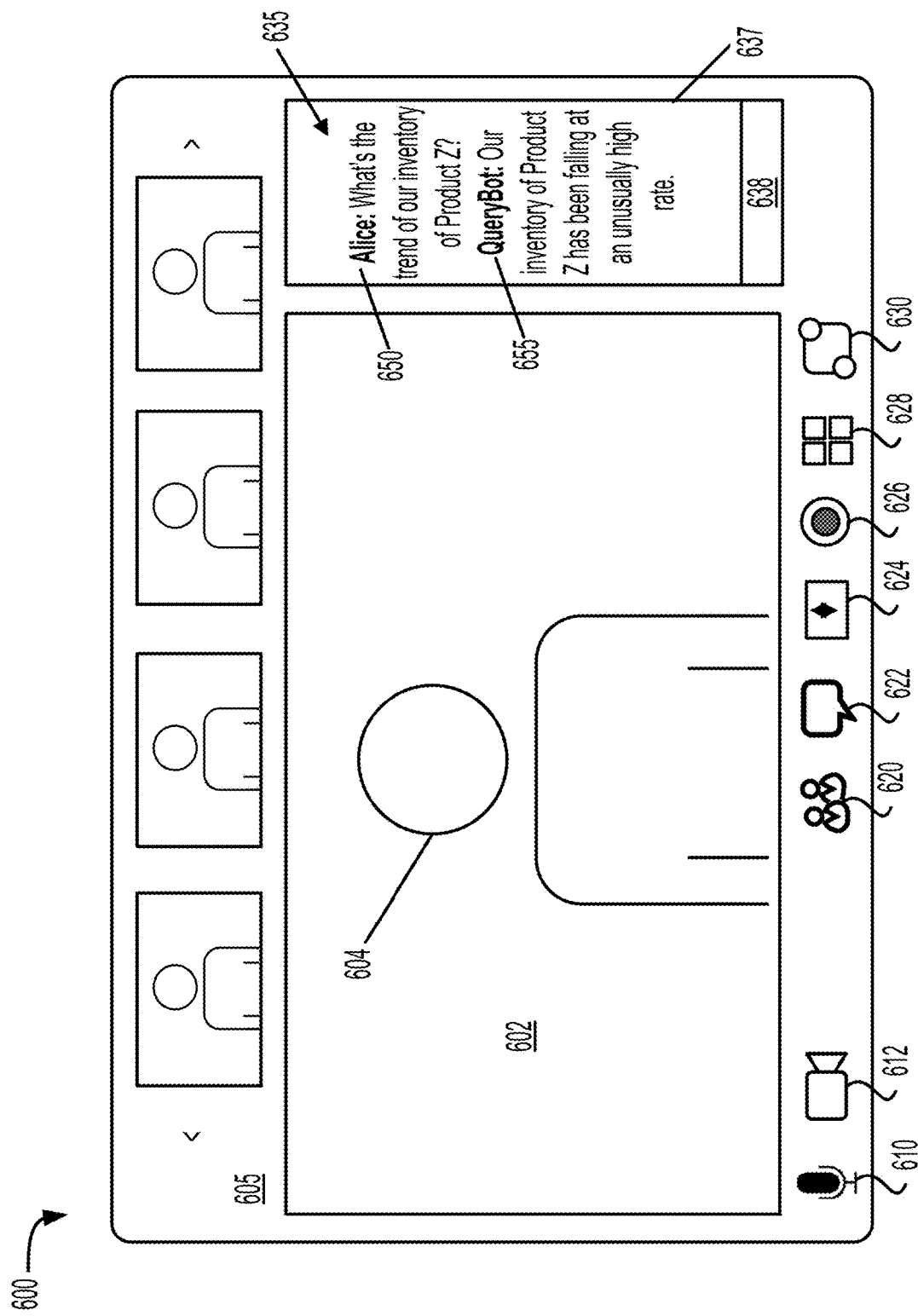
FIG. 6 shows an example of a graphical user interface ("GUI") for optimized LLM inference from structured data via intermediate documents, according to some aspects of the present disclosure.

Client devices 408, 410 may be any type of device capable of executing the appropriate client software for optimized LLM inference from structured data via intermediate documents. For example, the client devices 408, 410 may be laptops, desktops, smartphones, tablets, internet protocol (IP) phones, and so on. In general, the client devices 408, 410 may includes any suitable device that can receive text input. The client devices 408, 410 may execute video conference client software that includes a graphical user interface ("GUI") for optimized LLM inference from structured data via intermediate documents. An example of such a GUI is shown in FIG. 6 below.

Figure 5:
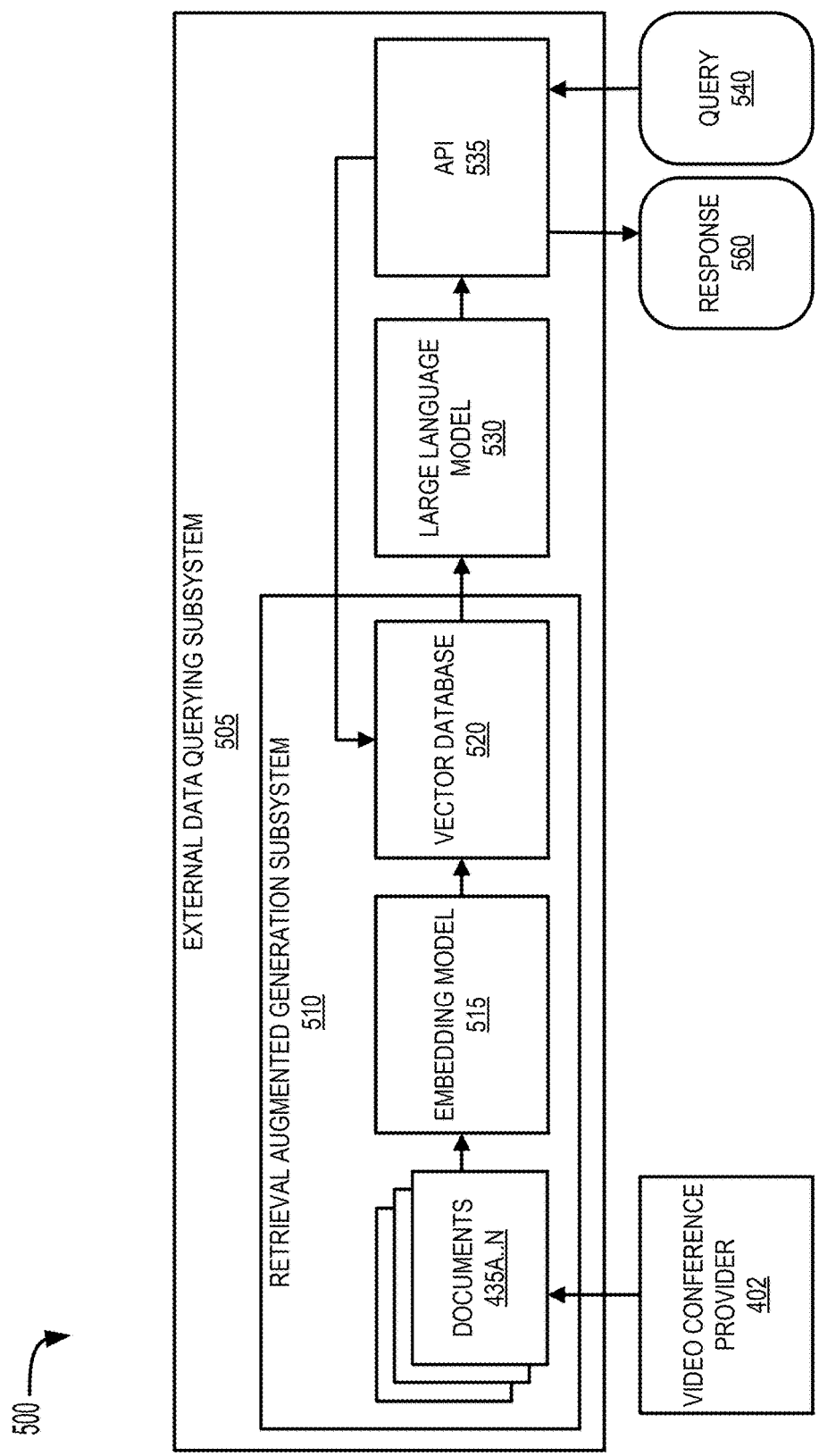
FIG. 5 shows another example of a system for optimized LLM inference from structured data via intermediate documents, according to some aspects of the present disclosure.

System 400 includes a data querying subsystem 420 that includes components for accessing databases, document generation and chunking component 432, interfacing with an LLM 455, and so on. In a typical example, a user using a client device 408 may use a GUI control such as a chat interface to output a natural-language query 460 to the video conference provider 402 via a suitable web-based application programming interface ("API"). The video conference provider 402 can relay the query 460 to the data querying subsystem 420 and receive a response 465. In some examples, the data querying subsystem 420 is a component of the video conference provider 402 instead of the external component illustrated in FIG. 4. FIG. 5, discussed in more detail below, depicts an example of a data querying subsystem 505 hosted externally or by a third-party provider.

The data querying subsystem 420 includes an LLM 455. The LLM 455 may be a self-hosted LLM or a third-party LLM accessible using a web-based API or other suitable method for remote access. A self-hosted LLM can refer to an LLM that is pre-trained and deployed on a computing environment operated by the video conference provider 402 such as server hardware, virtual machines, or a cloud computing environment. Examples of popular self-hosted LLMs include Meta's Llama 2 and 3, Mistral (https://mistral.ai/), Falcon (https://falconllm.tii.ae/), the MPT models of the MosaicML Foundation series, and BLOOM (https://bigscience.huggingface.co/), among many others. Examples of third-party LLMs include the OpenAI GPT series, the Claude models by Anthropic, Google's Gemini series, among many others. These examples are provided for context and are not intended to be limiting in any way.

The LLM 455 can include a response context. The response context includes the set of tokens or information that the LLM 455 uses, in part, to generate a response. In this respect, tokens can refer to words, portions of words, characters, punctuation, or other sub-parts of textual information. The response context can include a system or custom prompt, previous interactions, or additional information retrieved from a database or external source, which can then combined with the query or prompt given to the model. This latter addition of information to the response context is an example of a RAG mechanism implementation.

The dotted lines between the LLM 455 and the client device 410 are shown to depict the query 460/response 465 interaction between the LLM 455 and the client device 410. However in typical examples, the query 460 and response 465 are sent to the LLM 455 over the network 404. In one example, the LLM 455 receives, from client device 410, a query and generates a response 465 to the query 460. The LLM 455 then outputs the response 465 to the client device 410. The techniques for optimized LLM inference from structured data via intermediate documents disclosed herein can enable fast and accurate natural language queries against the information in a database (e.g., relational database 425).

The data querying subsystem 420 includes a number of components that can be used by the LLM 455 to generate the response 465. The data querying subsystem 420, as depicted in example system 400, includes a relational database 425. It should be noted that although system 400 includes the example of relational database 425, other databases used to persist structured or semi-structured data may be similarly used in various examples. For instance, some examples may use a document store or other "NoSQL" database, graph database, key-value store, object-oriented ("OO") database, or other suitable persistent store. Thus, while the example below is in the context of a relational database that includes tables, the techniques are equally applicable to other types of data stores.

For example, in the context of other types of data stores, data that might be stored in a row in a relational database may be stored as a serialized object in an OO database, a JSON document in a document-based database, or other instance of data in another type of data store. Thus, discussion relating to accessing rows of a relational table in the examples below may be considered as accessing an individual entity in a data store, irrespective of whatever storage paradigm a particular type of data store may use, e.g., tables in a relational database, objects in an OO database, nodes in a graph database, documents in a document store, and so forth.

In example system 400, the relational database 425 includes one or more collections such as tables 430a . . . n. In some examples, the tables 430a . . . n correspond to entities that can be used as the subject of analytics such as information about customers, networks, prices, sales, etc. in accordance with a particular data or domain model. In general, however, the tables 430a . . . n need not conform to any particular data or domain model.

The techniques of this disclosure are optimized for use with data persisted in a database, such as relational database 425, that is semi-structured or structured. Semi-structured or structured data may include data that is organized according to a predefined schema and is suitable for conversion to a natural language textual format. Examples of semi-structured data include data contained in JavaScript Object Notation ("JSON") or Extensible Markup Language ("XML") objects or files. Examples of structured data include data contained in SQL or relational tables, a spreadsheet, or a comma-separated value ("CSV") file. The various examples of persistent stores for semi-structured or structured data given above may each include a number of collections for organizing the data, corresponding to the tables 430a . . . n in example system 400.

The data querying subsystem 420 includes document generation and chunking component 432 that can generate one or more documents 435a . . . n based on one table 430a from among the tables 430a . . . n. For example, document generation and chunking component 432 may include components that can receive as input a table 430a (or other collection) and generate a natural language text based on the table 430a. For instance, consider an example table 430a that is a "Network Statistics" table. The table 430a may contain a number of rows, each row having a number of columns, each column having an associated datatype, and some portion of the columns being populated with data. In some examples, each row of the table 430a can be converted into a natural language sentence. In some examples, a set of rows may be converted into a natural language sentence. Other approaches to conversion of the table 430a may be similarly selected.

The natural language text thus created can be used to create or add to the documents 435a . . . n. For instance, one document 435a may include all of the rows of table 430a as natural language sentences. In another example, one document 435a may include a predefined number of rows (or grouping of rows) as natural language sentences to ensure that the size of each document 435a does not grow unmanageably large. For instance, a document 435a could be limited to 100 converted rows or 5 megabytes of data.

In one example, document generation and chunking component 432 can be implemented as a text conversion engine that receives information about the tables 430a . . . n from relational database 425 and generates natural language sentences using a template-based approach. For example, templates can be used to ensure that various datatypes are cogently represented as text (e.g., a machine-readable timestamp such as "2023-04-05T14:30:00Z" can be templated to be output as "Apr. 5, 2023 at 10:30 AM Eastern Standard Time") that is better suited for processing by LLM 455. Some examples may further include natural language processing ("NLP") components or LLMs to generate or refine the natural language sentences.

The natural language sentences (or other suitable natural language grouping) thus generated may each be characterized by one or more topics. In general, the topic may refer to a textual element or class of textual elements that may be used to identify related documents such as a place identifier, person identifier, ID number, category, and so on. The topics can be used to group the documents 435a . . . n into portions or "chunks" 437a . . . n, a process that is sometimes referred to as "chunking." The chunks 437a . . . n can be used to add information to the response context of the LLM 455 when responding to the query 460. This is an example of an implementation of a RAG mechanism.

For example, consider three generated, natural-language documents including 10 sentences each. Each sentence includes information relating to least one of topics A, B, and C. The document generation and chunking component 432 can determine portions of the three documents based on at least one topic. For instance, if topic A is selected, the portion may include two sentences from the first document, 4 sentences from the second document, and three sentences from the third document. The portion thus determined may be referred to as a "chunk." Selection of topics for chunking may be related to the topics of expected queries, as the chunks 437a . . . n can be used to efficiently augment the knowledge based of the LLM 455 during query response, as will be described below. For instance, if queries relating to customers are expected, then the documents 435a . . . n may be chunked by customer name or ID number. Selection of topics for chunking or the methods used to identify chunks may be configurable features of the document generation and chunking component 432.

Various approaches for the selection of topics for chunking or the methods used to identify chunks may be used. For example, some approaches can involve semantic chunking. Semantic chunking approaches can be topic-based and may involves dividing text based on meaning and context. Some other approaches may involve basic chunking strategies which are delimiter-based. Such approaches can rely on specific characters or patterns to divide the text and do not require any particular semantic "understanding" of the content. Other approaches, in addition to or in combination with these examples, can be used.

The data querying subsystem 420 includes vector database 440. The vector database 440 may be optimized for storage and retrieval of numerical vectors and other associated information using, for example, a similarity measure (e.g., Euclidean distance or cosine similarity). The vector database 440 can receive the chunks 437a . . . n from document generation and chunking component 432 and index or sort them according by topic.

For example, the vector database 440 can receive the chunks 437a . . . n and generate an embedded representation of each chunk. The embedded representation may be, for example, a high-dimensional vector (e.g., a large array of numerical values) generated by an ML model included with vector database 440, such as an encoder. The encoder may be a trained ML model of any suitable type including, without limitation, a convolutional neural network ("CNN"), recurrent neural networks ("RNN"), transformer, autoencoder, variational autoencoder, generative adversarial network ("GAN"), and so on. The embedded representations or vectors 445a . . . n output by the encoder can include as "encoded" data various aspects of the chunk such as the tokens, or words, contained therein, their relative positions, semantic information, and other characteristic features of the chunks 437a . . . n.

The vector database 440 can store the embedded vectors 445a . . . n. In some examples the embedded vectors 445a . . . n may be indexed or sorted to optimize the efficiency of retrieval. The vectors thus stored can be retrieved using a vector similarity search. For instance, one implementation of the vector similarity search may identify stored vectors and associated information having a minimized dot product with an embedded vector representing the object of the search (e.g., a topic identified in the query 460). The vector similarity search is useful for quickly identifying stored vectors with properties similar to a desired set of properties, such as a particular topic.

Thus, upon receiving a query 460, the data querying subsystem 420 can determine an embedded representation of the query 460 using, for example, an encoder component. The embedded representation of the query 460 can be used to search for related chunks 437a . . . n in the vector database 440. A chunk or selected embedded vector 450 thus identified can be added to the response context of the LLM 455 for responding to the query 460. In some examples, a number of chunks or selected embedded vectors 450 may be identified, corresponding to a the most relevant chunks as determined by the vector database 440. In some examples, the text associated with the selected embedded vector 450 is stored in the vector database along with the selected embedded vector 450. In some examples, an ML model such as a decoder can be trained to regenerate the text that produced the selected embedded vector 450.

Some examples of queries 460 and responses 465 are given to further illustrate operation of the example system 400. In a first example relating to sales performance analysis, the query 460 may be posed by a stakeholder. The query 460 may be "Which products have seen the highest sales growth in the past quarter?" The response 465 may be "Product X and Product Y have experienced the highest sales growth, with an increase of 25% and 30% respectively, in the past quarter."

In a second example relating to customer feedback insights, the query 460 may be input by a stakeholder. The query 460 may be "What are the most common complaints from customers regarding our mobile app?" The response 465 may be "The most common complaints from customers regarding the mobile app are frequent crashes and slow loading times."

In a third example relating to financial metrics, the query 460 may be input by a stakeholder. The query 460 may be "How did our operating expenses change compared to the same quarter last year?" The response 465 may be "Our operating expenses increased by 10% compared to the same quarter last year, primarily due to higher marketing and staffing costs."

In a fourth example relating to inventory management, the query 460 may be input by a stakeholder. The query 460 may be "Which items are currently out of stock in our warehouse?" The response 465 may be "Items A, B, and C are currently out of stock in our warehouse."

In a fifth example relating to employee performance, the query 460 may be input by a stakeholder. The query 460 may be "Which sales representatives exceeded their targets in the last month?" The response 465 may be "Sales representatives John Doe and Jane Smith exceeded their targets last month, with John achieving 110% and Jane achieving 120% of their targets."

In a sixth example relating to marketing campaign effectiveness, the query 460 may be input by a stakeholder. The query 460 may be "How effective was our recent email marketing campaign?" The response 465 may be "Our recent email marketing campaign had an open rate of 45% and a click-through rate of 12%, resulting in 300 new sign-ups."

Referring now to FIG. 5, FIG. 5 shows another example of a system 500 for optimized LLM inference from structured data via intermediate documents, according to some aspects of the present disclosure. In particular, system 500 depicts an example including an external data querying subsystem 505. In this case, rather than being a component of the video conference provider 402, the external data querying subsystem 505 is provided as an external service that is accessed by the video conference provider 402 using, for example, a suitable API. In some examples, the external data querying subsystem 505 may be provided by a third-party organization.

The external data querying subsystem 505 may be populated with a number of documents 435*a* . . . *n* generated using a process similar to the one described above with respect to the description of the document and chunking component 432 in FIG. 4 and in the example process 700 below. The documents 435*a* . . . *n* can be, for example, uploaded to the external data querying subsystem 505 using a web-based API, file transfer protocol ("FTP") upload, ETL procedure, or other method. The documents 435*a* . . . *n* are received by a retrieval augmented generation ("RAG") subsystem 510.

The RAG subsystem 510 includes an embedding model 515 that can generate embedded representations of the documents 435*a* . . . *n* following a chunking procedure similar to the one described above with respect to the description of the document and chunking component 432 in FIG. 4. The embedding model 515 may be, for example, an encoder ML model trained to generate the embedded representation. The encoder may be a trained ML model of any suitable type including, without limitation, a convolutional neural network ("CNN"), recurrent neural networks ("RNN"), transformer, autoencoder, variational autoencoder, generative adversarial network ("GAN"), and so on. The embedded representation thus generated can be output to a vector database 520 included in the RAG subsystem 510.

Similar to the sequence described above in FIG. 4, the external data querying subsystem 505 can receive a query 540 via an API 535. The query 540 may be a natural language query. A component of the external data querying subsystem 505 such as the embedding model 515 can be used to generate an embedded representation of the query 540. System 500 includes an LLM 530 that may be an externally-hosted LLM 530 provided by the external data querying subsystem 505 but may itself be self-hosted or operated by third-party cloud provider, similar to the LLM 455. The embedded representation of the query 540 can be used to search the vector database 520 for one or more chunks to add to the LLM context for responding. The LLM 530 can then output a response 560 via API 535 based on the query 540 and the added context retrieved from the vector database 520. The external data querying subsystem 505 thus enables the video conference provider to use the RAG subsystem 510 as a service, by uploading the documents 435*a* . . . *n*, providing additional configuration information, and then operating the service using API 535.

Turning next to FIG. 6, FIG. 6 shows an example of a GUI 600 for optimized LLM inference from structured data via intermediate documents, according to some aspects of the present disclosure. FIG. 6 depicts an example of a GUI 600 that may be shown on a display device of a client device 408 during video conferencing or chat messaging, although the techniques of this disclosure may be implemented in a variety of client GUI contexts. In particular, GUI 600 depicts an example of a client device user executing a query against structured data using an LLM in a chat-like interface.

GUI 600 shows an in-progress video conference as may be provided by suitable video conference client software. GUI 600 includes a main speaker window 602. In some examples, the GUI 600 is configured to display the video conference participant 604 that is currently speaking (e.g., "speaker view") on the main speaker window 602, but other configurations are possible. For instance, some examples include a GUI control for "pinning" a particular participant who can be shown in main speaker window 602 regardless of who is speaking.

The GUI 600 includes a number of video conference participants 606. In the GUI 600 configuration depicted, the participants 606 are shown at the top of the GUI 600. Depending on the configuration, in various examples, the participants 606 may be arrayed in a grid-like fashion, may not be shown at all, or may be displayed in some other manner. In this example, the participants 606 are shown above the main speaker window 602 as smaller participant windows, which allow the participant to view some of the other participants in the video conference, as well as controls ("<" and ">") to let the host scroll to view other participants in the video conference.

The GUI 600 includes a number of controls for configuring the video conference or interacting with the participants 606. For example, the GUI 600 includes controls 610 and 612 allow a participant to toggle on or off audio or video streams captured by a microphone or camera connected to the client device 410. Control 620 allows the participant to view any other participants present in the video conference along with the participant. Control 622 allows the participant to execute an application or client software function to send text or chat messages to other participants, whether to specific participants or to the entire meeting. Control 624 allows the participant to share content from their client device. Control 626 allows the participant toggle recording of the meeting, and control 628 allows the participant to select an option to join a breakout room. Control 630 allows the participant to launch an app within the video conference client software, to, for example, access content to share with other participants in the video conference.

The control 622, when selected, can launch a chat application 635. The chat application includes a main chat window 637 that shows a chat history among the participants or a subset thereof. The chat application also includes a chat input control 638 that can be used to input chat messages, share images or video, choose emojis, start threads, and so on.

GUI 600 illustrates an example dialog between a participant using client device 408 on which example GUI 600 may be displayed and the data querying subsystem 420. In chat application 635, the participant has entered query 650 using the chat input control 638. In some examples, the query 650 may be received by the data querying subsystem 420 and the topic identified. In this example, the topic may be identified as "Product Z." The data querying subsystem 420 can generate an embedded representation of this topic which can be used to search a vector database such as vector database 440, described above, to efficiently identify chunks associated with the identified topic. An LLM, such as LLM 455, can be used, in concert with the identified chunks via, for example, a RAG mechanism, to response to the query 650. In this example, the query response 655 is shown in chat application 635 as a dialog response to query 650. The user experience may include elements indicative of a "conversation" with the underlying data querying subsystem 420.

Although the example of a chat-like interface is depicted in FIG. 6, other GUI 600 implementations may provide GUIs for query 650/response 655 interaction using different GUI controls. For example, other GUI 600 implementations for may involve a voice command interface, dialog boxes, pre-determined queries and an associated menu system, and so on.

Figure 7:
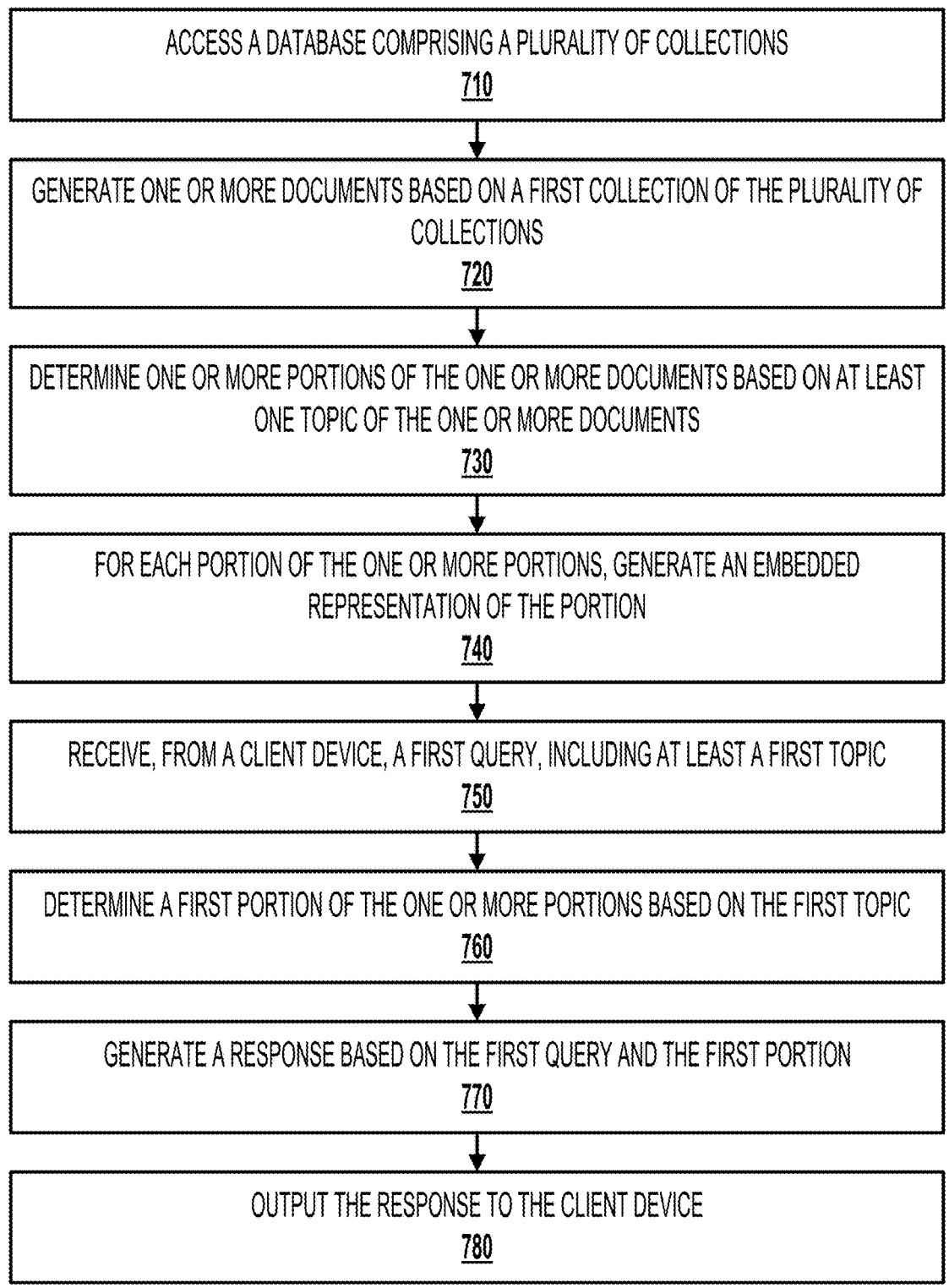
FIG. 7 shows a flowchart of an example method for optimized LLM inference from structured data via intermediate documents, according to some aspects of the present disclosure.

Referring now to FIG. 7, FIG. 7 shows a flowchart of an example method 700 for optimized LLM inference from structured data via intermediate documents, according to some aspects of the present disclosure. The description of the method 700 in FIG. 7 will be made with reference to FIGS. 4-6, however any suitable system according to this disclosure may be used, such as the example systems 100 and 200, shown in FIGS. 1 and 2. It should be appreciated that method 700 provides a particular method for optimized LLM inference from structured data via intermediate documents. Other sequences of operations may also be performed according to alternative examples. For example, alternative examples of the present disclosure may perform the steps outlined above in a different order. Moreover, the individual operations illustrated by method 700 may include multiple sub-operations that may be performed in various sequences as appropriate to the individual operation. Furthermore, additional operations may be added or removed depending on the particular applications. Further, the operations described in method 700 may be performed by different devices. For example, the description is given from the perspective of the video conference provider 402 but other configurations are possible. One of ordinary skill in the art would recognize many variations, modifications, and alternatives.

The method 700 may include block 710. At block 710, a computing system such as the video conference provider 402 accesses a database including a set of collections. In this example, the video conference provider 402 includes an implementation of the data querying subsystem 420. The database may be, for instance, a relational database (e.g., relational database 425 of FIG. 4) or other persistent store that can persist semi-structured or structured data. The collections may be data abstractions used by the database to persist related entities, such as relational database tables or document store collections.

In block 710, the computing system accesses the database using a suitable authentication or handshake mechanism such that the collections can be efficiently read. In some examples, an extract, transform, and load ("ETL") facility provided by the database may be used to quickly extract or "dump" information from the database. In some examples, an API provided by the database can likewise be used to efficiently retrieve collections or elements thereof from the database.

At block 720, the computing system generates one or more documents based on a first collection of the set of collections. For example, a component such as the document generation and chunking component 432 of FIG. 4 can be used to convert the first collection to one or more documents. The one or more documents may include the first collection represented as natural language.

In one example, in which the first collection is a relational database table, each row of the table can be converted into a natural language sentence describing the content of the row. The document generation and chunking component 432 may use components such as a templating engine, NLP algorithm, or LLM to generate the documents. In another example, a document store may include one or more collections of JavaScript Object Notation ("JSON") documents. Each JSON document can be similarly converted into a natural language sentence describing the contents of the JSON document.

In general, various databases that can be used to persist structured or semi-structured data may be used as the source of the collections in block 720. For instance, some examples may use a document store or other "NoSQL" database, graph database, key-value store, object-oriented ("OO") database, or other suitable persistent store. In the context of other types of data stores, a suitable unit of data, in analogy to the database row, can be selected as the unit basis of conversion to natural language. For instance, rows or columns (or groupings thereof) may be used with a relational database, a serialized object for an OO database, a JSON document for a document-based database, or other instance of data in another type of data store. In some examples, the collections themselves may be the basis for conversion to a natural language sentence. For instance, a relational database table can be converted into one or more natural language sentences.

Some examples may not have a one-to-one correspondence between table rows and sentences. For example, an entire table with numerous rows can be converted into a single document. In contrast, in some examples, a single table row may be converted into numerous natural language sentences. The configuration of the document generation and chunking component 432 can be changed in accordance with factors such as the expected size of the collections, optimizations associated with the length of the natural language text (e.g., the number of tokens that can be read by the downstream LLM), and so on.

The operations described in blocks 710 and 720 can be configured to occur once upon initial setup of a system such as systems 400 or 500 of FIGS. 4 and 5. In some examples, the operations of blocks 710 and 720 can be configured to be performed periodically or can be triggered by certain events. For instance, a daily (or other suitable periodicity) task or "cronjob" can be initialized to generate documents based on certain collections or changes to collections. In another example, the system 400 can be configured to generate documents any time a change or threshold number of changes are made to a collection or collections.

At block 730, the computing system determines one or more portions of the one or more documents based on at least one topic of the one or more documents. This process may be referred to as "chunking." Chunking can refer to selection of a portion of one or more natural language documents according to one or more topics. In general, the topic may refer to any element that unifies one or more document portions, such as a common place, person, ID number or string, income, etc.

Consider an example in which each document includes a number of natural language sentences. For instance, the first collection or table may include a set of rows and each row can include a set of columns or fields. The document, then, may be a set of sentences in which each sentence is based on at least one field or column of at least one row. The computing system can then identify one or more sentences of the set of sentences in the document that include a textual representation of a topic. For example, an LLM or other NLP processing engine can be used to identify or select sentences or portions of sentences that include a specified topic. For instance, if an LLM is used, a prompt may include an input sentence and an instruction to determine if the sentence includes any mention of the topic.

In some examples, for each of the identified sentences, one or more surrounding contextual sentences may be included in the chunks as well. For instance, a database table that includes time-series data may be converted into natural language descriptions of a sequence of events that can be more readily queried given context about events that occurred before or after events in question. The computing system can then designate each of the identified sentences and the associated surrounding contextual sentences as a chunk or portion.

At block 740, the computing system generates, for each portion of the one or more portions, an embedded representation of the portion. The embedded representation may be, for example, an embedded vector or high-dimensional array representation of each portion. In some examples, the embedded representation can be generated by a vector database, such as vector database 440 as described in FIG. 4 above, upon receiving or prior to indexing or persisting each portion.

In some other examples, the document generation and chunking component 432 may include an ML model trained to generate the embedded representation, such as an encoder. The encoder may be a trained ML model of any suitable type including, without limitation, a convolutional neural network ("CNN"), recurrent neural networks ("RNN"), transformer, autoencoder, variational autoencoder, generative adversarial network ("GAN"), and so on. In this case, each embedded vector thus generated can be output to a vector database and be effectively indexed therein based on the associated topic. Indexing, in this respect, may refer to sorting or grouping the embedded vectors in a manner suitable for efficient querying using a similarity measure.

At block 750, the computing system receives, from a client device, a first query, including at least a first topic. For example, a chat interface, such as the example depicted in GUI 600 of FIG. 6 can be used to input and send the first query to the computing system. The first query may be phrased as a natural language question, assertion, imperative, etc. directed towards an LLM (e.g., LLM 455) or other agent capable of natural language dialog for optimized LLM inference from structured data via intermediate documents. The computing system can generate an embedded representation of the first query using, for example, an encoding component. The encoding component may be a trained ML model.

At block 760, the computing system determines a first portion of the one or more portions based on the embedded representation of the first query. The first portion, or chunk, may be identified by searching a database such as vector database 440 of FIG. 4 or vector database 520 of FIG. 5 that is configured for similarity searching. For example, the LLM may output, to the vector database, a vector-based query based on an embedded representation of the first topic. The vector database can output one or more embedded vectors responsive to the vector-based query.

The output of the vector database may be passed through a trained ML model such as a decoder that can be trained to convert the portion identified to text based on the content of the embedded vectors. In some examples, the vector database itself may be supplemented with the text used to generate the output embedded vectors. For instance, the embedded vector representation of each portion can be used as a searchable key, while the textual portion itself is stored as the value in a key-value storage paradigm.

At block 770 the computing system generates a response based on the first query and the first portion. For example, the first query, the first portion received from the vector database in block 760 above, and a suitable prompt may be sent to the LLM to generate the response using the RAG mechanism as implemented in this example. For instance, the first portion may be added to an existing prompt, added to the response context using a suitable API, or input to the LLM as a query, to be thereby added to the conversation context.

At block 780, the computing system outputs the response to the client device. For example, the response may be returned to the client device via the web-based API to cause the response to appear in the chat-like interface of example GUI 600. The chat-like interface may invoke a user experience including elements indicative of a dialog with the LLM. Other means for displaying the output response can be used including voice, email, notifications, and so on.

Figure 8:
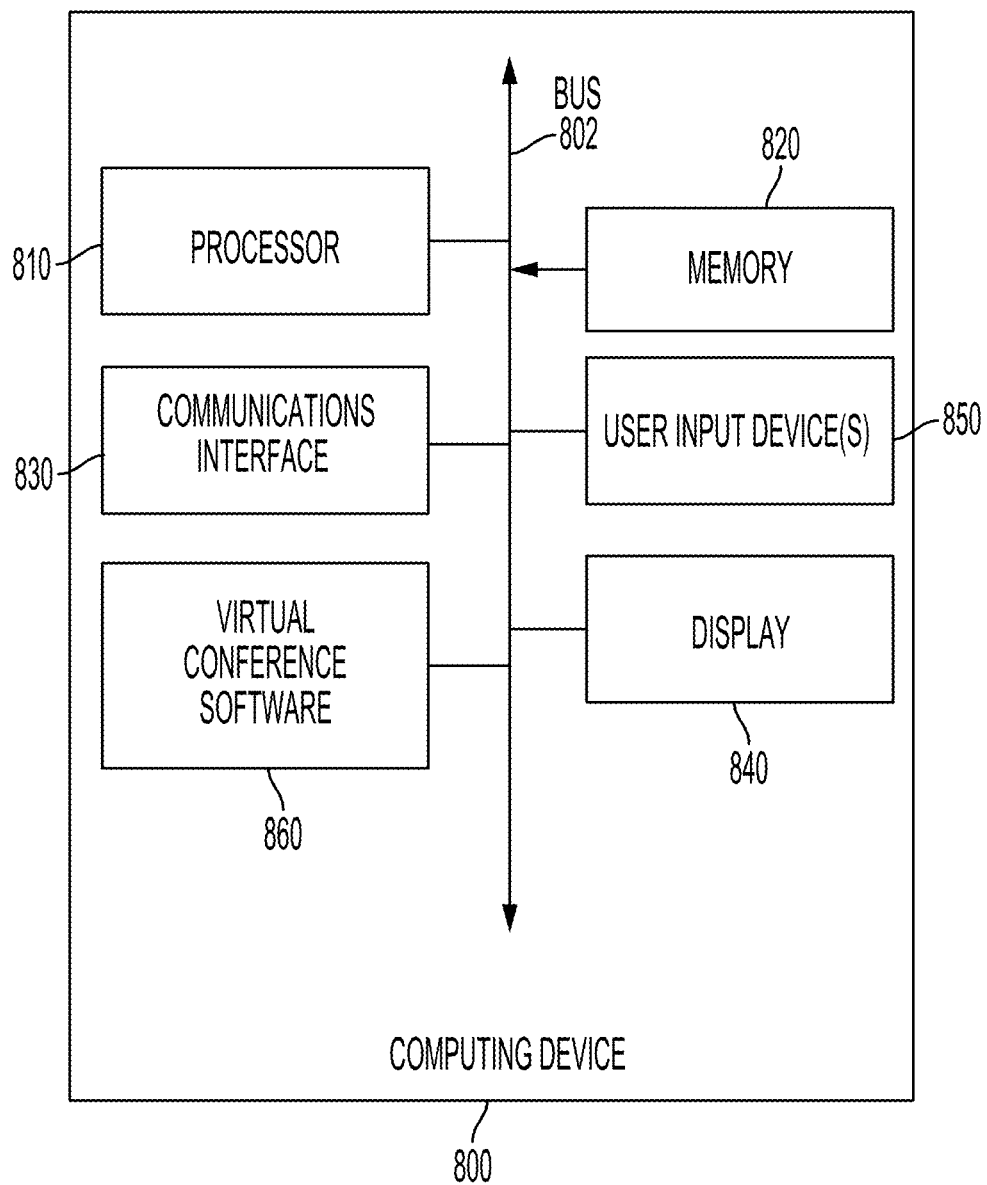
FIG. 8 shows an example computing device suitable for use in example systems or methods for providing optimized LLM inference from structured data via intermediate documents, according to some aspects of the present disclosure.

Referring now to FIG. 8, FIG. 8 shows an example computing device 800 suitable for use in example systems or methods for providing optimized LLM inference from structured data via intermediate documents, according to some aspects of the present disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for optimized LLM inference from structured data via intermediate documents according to different examples, such as part or all of the example method 700 described above with respect to FIG. 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes virtual conferencing software 860 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: accessing a database comprising a plurality of collections; generating one or more documents based on a first collection of the plurality of collections; determining one or more portions of the one or more documents based on at least one topic of the one or more documents; for each portion of the one or more portions, generating an embedded representation of the portion; receiving, from a client device, a first query, including at least a first topic; determining a first portion of the one or more portions based on the first topic; generating a response based on the first query and the first portion; and outputting the response to the client device.

Example 2 is the method of example(s) 1, wherein generating the response based on the first query and the first portion comprises: outputting the first query and the first portion to a large language model ("LLM"); and receiving, from the LLM, the response.

Example 3 is the method of example(s) 1, wherein generating the one or more documents based on the first collection of the plurality of collections comprises generating a natural language text based on the first collection.

Example 4 is the method of example(s) 3, wherein the database is a relational database and the plurality of collections is a plurality of tables.

Example 5 is the method of example(s) 4, wherein: the first collection is a first table; the first table includes a plurality of rows, each row comprising a plurality of fields; and the natural language text comprises a plurality of sentences, each sentence based on at least one field of at least one row.

Example 6 is the method of example(s) 5, wherein determining the one or more portions of the one or more documents based on the at least one topic comprises: identifying one or more sentences of the plurality of sentences that include a textual representation of the at least one topic; for each of the identified sentences, selecting one or more associated surrounding contextual sentences; and designating each of the identified sentences and associated surrounding contextual sentences as a second portion of the one or more portions.

Example 7 is the method of example(s) 1, wherein the embedded representation is an embedded vector.

Example 8 is the method of example(s) 7, further comprising, for each portion of the one or more portions, outputting the embedded vector of the portion to a vector database, wherein the embedded vector of the portion is indexed in the vector database based on the at least one topic.

Example 9 is the method of example(s) 8, wherein determining the first portion of the one or more portions based on the first topic comprises: outputting, to the vector database, a second query based on the first topic; and receiving, from the vector database, one or more embedded vectors responsive to the second query.

Example 10 is the method of example(s) 1, wherein the first query is a natural language query.

Example 11 is a non-transitory computer-readable medium storing instructions that, when executed by one or more processors, cause the one or more processors to perform operations including: accessing a database comprising a plurality of collections; generating one or more documents based on a first collection of the plurality of collections; determining one or more portions of the one or more documents based on at least one topic of the one or more documents; for each portion of the one or more portions, generating an embedded representation of the portion; receiving, from a client device, a first query, including at least a first topic; determining a first portion of the one or more portions based on the first topic; generating a response based on the first query and the first portion; and outputting the response to the client device.

Example 12 is the non-transitory computer-readable medium of example(s) 11, wherein generating the response based on the first query and the first portion comprises: outputting the first query and the first portion to a large language model ("LLM"), wherein the first query is a natural language query; and receiving, from the LLM, the response.

Example 13 is the non-transitory computer-readable medium of example(s) 11, wherein generating the one or more documents based on the first collection of the plurality of collections comprises generating a natural language text based on the first collection.

Example 14 is the non-transitory computer-readable medium of example(s) 13, wherein: the database is a relational database and the plurality of collections is a plurality of tables; the first collection is a first table; the first table includes a plurality of rows, each row comprising a plurality of fields; and the natural language text comprises a plurality of sentences, each sentence based on at least one field of at least one row.

Example 15 is the non-transitory computer-readable medium of example(s) 11, wherein: the embedded representation is an embedded vector; and the operations further comprise, for each portion of the one or more portions, outputting the embedded vector of the portion to a vector database, wherein the embedded vector of the portion is indexed in the vector database based on the at least one topic.

Example 16 is a system comprising: one or more processors; and one or more computer-readable storage media storing instructions which, when executed by the one or more processors, cause the one or more processors to perform operations including: accessing a database comprising a plurality of collections; generating one or more documents based on a first collection of the plurality of collections; determining one or more portions of the one or more documents based on at least one topic of the one or more documents; for each portion of the one or more portions, generating an embedded representation of the portion; receiving, from a client device, a first query, including at least a first topic; determining a first portion of the one or more portions based on the first topic; generating a response based on the first query and the first portion; and outputting the response to the client device.

Example 17 is the system of example(s) 16, wherein generating the response based on the first query and the first portion comprises: outputting the first query and the first portion to a large language model ("LLM"), wherein the first query is a natural language query; and receiving, from the LLM, the response.

Example 18 is the system of example(s) 16, wherein generating the one or more documents based on the first collection of the plurality of collections comprises generating a natural language text based on the first collection.

Example 19 is the system of example(s) 18, wherein: the database is a relational database and the plurality of collections is a plurality of tables; the first collection is a first table; the first table includes a plurality of rows, each row comprising a plurality of fields; and the natural language text comprises a plurality of sentences, each sentence based on at least one field of at least one row.

Example 20 is the system of example(s) 16, wherein: the embedded representation is an embedded vector; and the operations further comprise, for each portion of the one or more portions, outputting the embedded vector of the portion to a vector database, wherein the embedded vector of the portion is indexed in the vector database based on the at least one topic.

That which is claimed is:
1. A method, comprising:
    accessing a database comprising a plurality of collections;
    generating one or more documents based on a first collection of the plurality of collections;
    determining one or more portions of the one or more documents based on at least one topic of the one or more documents;

for each portion of the one or more portions, generating an embedded representation of the portion, wherein the embedded representation comprises an embedded vector;

receiving, from a client device, a first query, including at least a first topic;

determining a first portion of the one or more portions based on the first topic;

generating a response based on the first query and the first portion; and outputting the response to the client device.

2. The method of claim 1, wherein generating the response based on the first query and the first portion comprises:
outputting the first query and the first portion to a large language model ("LLM"); and
receiving, from the LLM, the response.

3. The method of claim 1, wherein generating the one or more documents based on the first collection of the plurality of collections comprises generating a natural language text based on the first collection.

4. The method of claim 3, wherein the database is a relational database and the plurality of collections is a plurality of tables.

5. The method of claim 4, wherein:
the first collection is a first table;
the first table includes a plurality of rows, each row comprising a plurality of fields; and
the natural language text comprises a plurality of sentences, each sentence based on at least one field of at least one row.

6. The method of claim 5, wherein determining the one or more portions of the one or more documents based on the at least one topic comprises:
identifying one or more sentences of the plurality of sentences that include a textual representation of the at least one topic;
for each of the identified sentences, selecting one or more associated surrounding contextual sentences; and
designating each of the identified sentences and associated surrounding contextual sentences as a second portion of the one or more portions.

7. The method of claim 1, further comprising, for each portion of the one or more portions, outputting the embedded vector of the portion to a vector database, wherein the embedded vector of the portion is indexed in the vector database based on the at least one topic.

8. The method of claim 7, wherein determining the first portion of the one or more portions based on the first topic comprises:
outputting, to the vector database, a second query based on the first topic; and
receiving, from the vector database, one or more embedded vectors responsive to the second query.

9. The method of claim 1, wherein the first query is a natural language query.

10. The method of claim 1, wherein generating the embedded vector for each portion comprises:
providing the portion to an encoder model trained to generate a plurality of embedded vectors for indexing in a vector database; and
receiving, from the encoder model, the embedded vector.

11. A non-transitory computer-readable medium storing instructions that, when executed by one or more processors, cause the one or more processors to perform operations including:
accessing a database comprising a plurality of collections;
generating one or more documents based on a first collection of the plurality of collections;
determining one or more portions of the one or more documents based on at least one topic of the one or more documents;
for each portion of the one or more portions, generating an embedded representation of the portion, wherein the embedded representation comprises an embedded vector;
receiving, from a client device, a first query, including at least a first topic;
determining a first portion of the one or more portions based on the first topic;
generating a response based on the first query and the first portion; and
outputting the response to the client device.

12. The non-transitory computer-readable medium of claim 11, wherein generating the response based on the first query and the first portion comprises:
outputting the first query and the first portion to a large language model ("LLM"), wherein the first query is a natural language query; and
receiving, from the LLM, the response.

13. The non-transitory computer-readable medium of claim 11, wherein generating the one or more documents based on the first collection of the plurality of collections comprises generating a natural language text based on the first collection.

14. The non-transitory computer-readable medium of claim 13, wherein:
the database is a relational database and the plurality of collections is a plurality of tables;
the first collection is a first table;
the first table includes a plurality of rows, each row comprising a plurality of fields; and
the natural language text comprises a plurality of sentences, each sentence based on at least one field of at least one row.

15. The non-transitory computer-readable medium of claim 11, wherein:
the operations further comprise, for each portion of the one or more portions, outputting the embedded vector of the portion to a vector database, wherein the embedded vector of the portion is indexed in the vector database based on the at least one topic.

16. A system comprising:
one or more processors; and
one or more computer-readable storage media storing instructions which, when executed by the one or more processors, cause the one or more processors to perform operations including:
accessing a database comprising a plurality of collections;
generating one or more documents based on a first collection of the plurality of collections;
determining one or more portions of the one or more documents based on at least one topic of the one or more documents;
for each portion of the one or more portions, generating an embedded representation of the portion, wherein the embedded representation comprises an embedded vector;
receiving, from a client device, a first query, including at least a first topic;
determining a first portion of the one or more portions based on the first topic;

generating a response based on the first query and the first portion; and outputting the response to the client device.

17. The system of claim 16, wherein generating the response based on the first query and the first portion comprises:

outputting the first query and the first portion to a large language model ("LLM"), wherein the first query is a natural language query; and receiving, from the LLM, the response.

18. The system of claim 16, wherein generating the one or more documents based on the first collection of the plurality of collections comprises generating a natural language text based on the first collection.

19. The system of claim 18, wherein:

the database is a relational database and the plurality of collections is a plurality of tables;

the first collection is a first table;

the first table includes a plurality of rows, each row comprising a plurality of fields; and the natural language text comprises a plurality of sentences, each sentence based on at least one field of at least one row.

20. The system of claim 16, wherein:

the operations further comprise, for each portion of the one or more portions, outputting the embedded vector of the portion to a vector database, wherein the embedded vector of the portion is indexed in the vector database based on the at least one topic.

* * * * *